(12) United States Patent
Ogawa et al.

(10) Patent No.: US 10,409,328 B2
(45) Date of Patent: Sep. 10, 2019

(54) DOCKING DEVICE

(71) Applicant: LENOVO (SINGAPORE) PTE. LTD., Singapore (SG)

(72) Inventors: Tetsuo Ogawa, Kanagawa (JP); Kazuya Tatsuno, Kanagawa (JP); Yoshiyuki Shibayama, Kanagawa (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 0 days.

(21) Appl. No.: 16/016,224

(22) Filed: Jun. 22, 2018

(65) Prior Publication Data
US 2018/0373290 A1 Dec. 27, 2018

(30) Foreign Application Priority Data
Jun. 23, 2017 (JP) .................................. 2017-122854

(51) Int. Cl.
*G06F 1/16* (2006.01)

(52) U.S. Cl.
CPC .... *G06F 1/1632* (2013.01); *G06F 2213/0042* (2013.01)

(58) Field of Classification Search
CPC ................................. G06F 1/1632; G06F 1/16
See application file for complete search history.

(56) References Cited

U.S. PATENT DOCUMENTS

| | | | | |
|---|---|---|---|---|
| 6,280,212 B1* | 8/2001 | Nguyen | ................ | G06F 1/1632 439/157 |
| 6,768,637 B1* | 7/2004 | Amemiya | ............. | G06F 1/1632 361/679.27 |
| 9,915,977 B1* | 3/2018 | Chu | ....................... | G06F 1/1632 |
| 10,074,935 B2* | 9/2018 | Kato | ..................... | H01R 13/518 |
| 2002/0159231 A1* | 10/2002 | Nguyen | ................ | G06F 1/1632 361/679.27 |
| 2011/0095724 A1* | 4/2011 | Byrne | .................. | G11B 33/122 320/115 |

(Continued)

FOREIGN PATENT DOCUMENTS

| | | |
|---|---|---|
| JP | 05-079625 | 10/1993 |
| JP | 2013225265 A | 10/2013 |
| JP | 2015018316 A | 1/2015 |

*Primary Examiner* — Binh B Tran
*Assistant Examiner* — Douglas R Burtner
(74) *Attorney, Agent, or Firm* — Antony P. Ng; Russell Ng PLLC (57) ABSTRACT

A docking device is provided. The docking device includes a device mounting part for mounting a portable information device having a forward-descending angular position so that the portable information device comes in contact with the face for use at a front end and is supported by the device mounting part at a rear end; a connection part opposed to a lateral face of the portable information device when the portable information device is mounted on the device mounting part; a connector being connectable to a connection terminal at the lateral face of the portable information device mounted on the device mounting part; a detector for detecting a mounting angle of the portable information device mounted on the device mounting part; and an angle adjustment part to rotate the connector according to the mounting angle detected by the detector.

16 Claims, 10 Drawing Sheets

(56) References Cited

U.S. PATENT DOCUMENTS

| | | | |
|---|---|---|---|
| 2016/0062399 A1* | 3/2016 | Hsu | G06F 1/1601 |
| | | | 361/679.21 |
| 2016/0062400 A1* | 3/2016 | Hsu | G06F 1/1632 |
| | | | 361/679.21 |
| 2016/0349793 A1* | 12/2016 | Tsukasaki | G06F 1/1632 |
| 2017/0153667 A1* | 6/2017 | Suckle | G06F 1/1632 |
| 2017/0208697 A1* | 7/2017 | Kurian | H02J 7/0044 |
| 2017/0285689 A1* | 10/2017 | Nakatani | G06F 1/1616 |
| 2018/0364756 A1* | 12/2018 | Lee | G06F 1/1632 |

* cited by examiner

DOCKING DEVICE

PRIORITY CLAIM

The present application claims benefit of priority under 35 U.S.C. §§ 120, 365 to the previously filed Japanese Patent Application No. JP2017-122854 with a priority date of Jun. 23, 2017, which is incorporated by reference herein.

TECHNICAL FIELD

The present invention relates to docking devices in general, and in particular to a docking device to which a portable information device can be attached.

BACKGROUND

A portable information device, such as a laptop personal computer (laptop PC), that is lightweight and compact for better portability often has limited functions. Thus, a docking device for feature expansion has been provided laptop PCs. Such a docking device connects to a laptop PC via a connector for feature expansion on the laptop PC.

A docking device, for example, includes a connector extending horizontally at a lateral part of its device mounting part, and the connector connects to a connection terminal of a portable information device on the lateral face. A docketing device, however, is not designed to provide connections to different portable information devices. Thus, the docketing device cannot deal with a difference in the dimension of the chassis in the front-rear direction due to types or specifications of portable information devices. As a result, it is difficult for the docketing device to connect the connector to various types of portable information devices smoothly and correctly.

Consequently, it would be preferable to provide an unproved docking device that can connect correctly to multiple types of portable information devices.

SUMMARY

In accordance with an embodiment of the present disclosure, a docking device includes a device mounting part for mounting a portable information device having a forward-descending angular position so that the portable information device comes in contact with the face for use at a front end and is supported by the device mounting part at a rear end; a connection part opposed to a lateral face of the portable information device when the portable information device is mounted on the device mounting part; a connector being connectable to a connection terminal at the lateral face of the portable information device mounted on the device mounting part; a detector for detecting a mounting angle of the portable information device mounted on the device mounting part; and an angle adjustment part to rotate the connector according to the mounting angle detected by the detector.

With the above-mentioned configuration, the connector can be adjusted to have the angular position corresponding to a different angle when portable information devices having different specifications are docked with the docking device. The connector can be opposed to the connection terminal at the lateral face of the portable information device, and so the connector and the connection terminal can connect smoothly and correctly. As a result, the docking device can be utilized to dock with various types of portable information devices.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
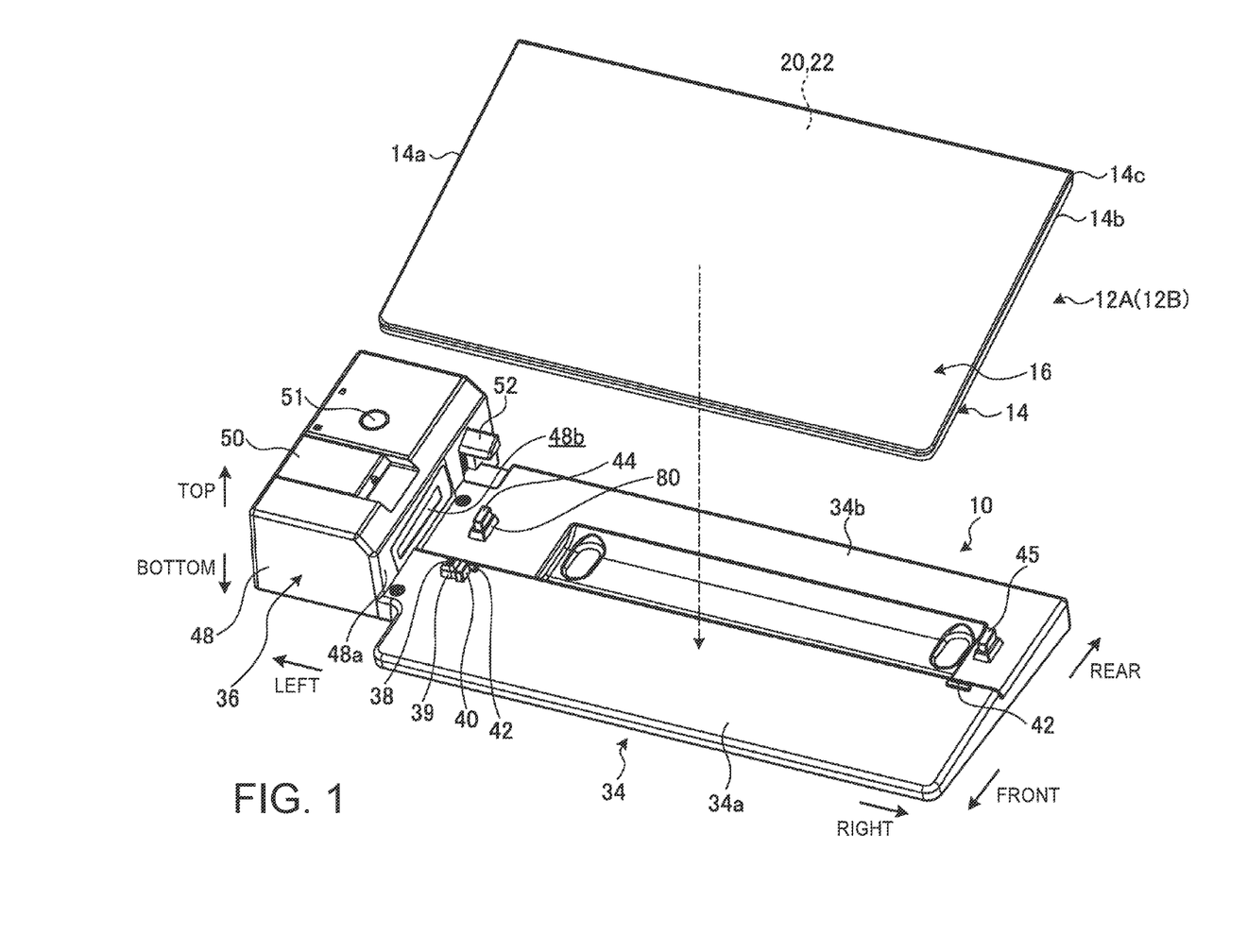
FIG. 1 is a perspective view showing the operation to dock a portable information device with a docking device, according to one embodiment.
Figure 2A:
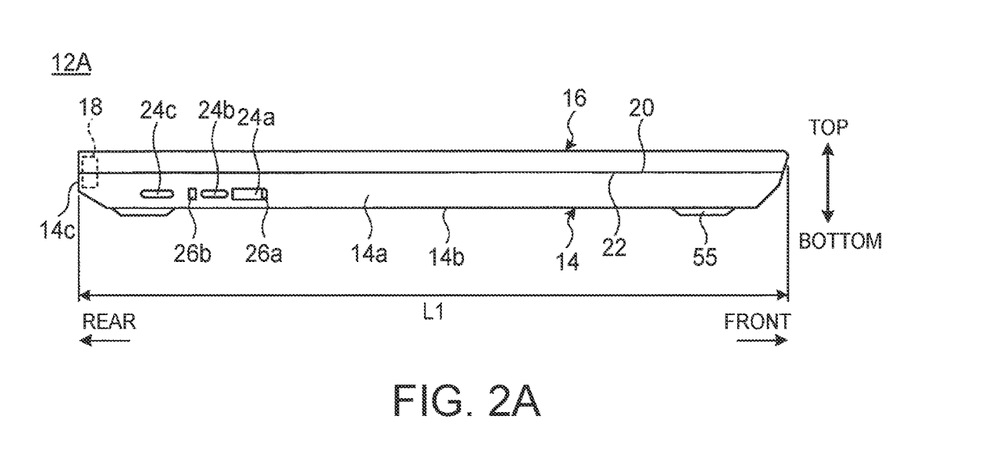
FIG. 2A is a side view of an electronic apparatus.
Figure 2B:
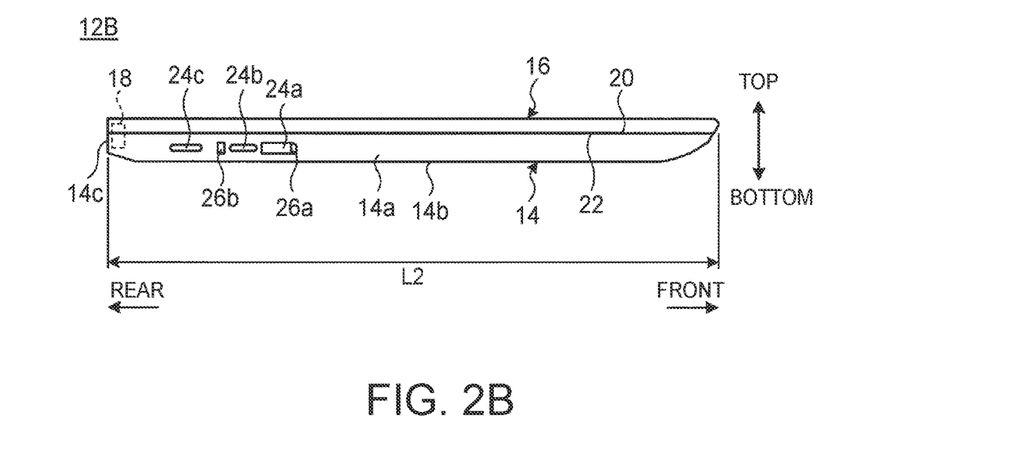
FIG. 2B is a side view of a portable information device having different specifications from those of the portable information device from FIG. 2A.

FIG. 1 is a perspective view showing the operation to dock a portable information device 12A with a docking device 10, according to one embodiment. FIG. 2A is a side view of the portable information device 12A, and FIG. 2B is a side view of a portable information device 12B having different specifications from those of the portable information device 12A from FIG. 2A.

To the docking device 10 of the present embodiment, the portable information device 12A, 12B that is a laptop PC, for example, can be attached detachably. The portable information device 12A and the portable information device 12B are different at least in their outer shape. Although a plurality of types of portable information devices other than the portable information devices 12A and 12B can be attached to the docking device 10, the following describes as a typical example the case of attaching and detaching of the two types of portable information devices 12A and 12B. The docking device 10 expands the function of the portable information device 12A, 12B attached thereto, such as a connection to a plurality of peripherals or networks. This means that an electronic apparatus obtained by attaching the portable information device 12A, 12B to the docking device 10 can have a higher function than that of the portable information device 12A, 12B alone. The docking device 10 can be used for feature expansion of portable information devices other than laptop PCs, such as a tablet, a mobile phone, a smartphone, and an electronic organizer.

In the following description, referring to the portable information device 12A mounted on the docking device 10 shown in FIG. 1, the front and the rear are defined as in FIG. 1, the thickness direction of the docking device 10 and the portable information device 12A, 12B is defined as upper and lower, and their width direction is defined as left and right.

FIG. 2A shows the portable information device 12A as one example of the device to be connected to the docking device 10, and the portable information device 12A has a clam shell structure, i.e., having a main body chassis 14 to which a display chassis 16 joins openably/closably via a hinge 18. The portable information device 12A has a keyboard 20 on the upper face of the main body chassis 14, and a display 22 on the lower face of the display chassis 16. The main body chassis 14 includes connection terminals 24a, 24b, 24c and guide holes 26a, 26b on the left lateral face (lateral face 14a).

The connection terminals 24a-24c are arranged side-by-side in the front-rear direction at a part closer to the rear end of the lateral face 14a. The connection terminals 24a to 24c can connect to connectors 30a to 30c (see FIG. 6) of the docking device 10. Such a connection of the connectors 30a to 30c to the connection terminals 24a to 24c, respectively, connects the docking device 10 to the portable information device 12A electrically. The portable information device 12A then can have various types of extended functions that the docking device 10 has. The connection terminals 24a to 24c and the connectors 30a to 30c may have a single structure or a double structure, for example, instead of the triple structure. The connectors 30a to 30c and the connection terminals 24a to 24c connect in conformity with the USB (Universal Serial Bus) standard, for example.

The guide holes 26a, 26b are arranged side-by-side with the connection terminals 24a to 24c. To the guide holes 26a, 26b, guide pins 32a, 32b (see FIG. 6) of the docking device 10 are inserted. The guide pins 32a, 32b are arranged side-by-side with the connectors 30a to 30c of the docking device 10. Insertion of the guide pins 32a and 32b into the guide holes 26a and 26b, respectively, can position the connectors 30a to 30c and the connection terminals 24a to 24c mutually for correctly and smooth connection of them. The number of the guide holes and the guide pins can be changed, and the guide holes and the guide pins may be omitted.

As stated above, the portable information device 12B having different specifications and being different from the portable information device 12A from FIG. 2A in the dimension in the front-rear direction can be attached detachably to the docking device 10 of the present embodiment.

As shown in FIG. 2B, the portable information device 12B is another example of the device to be connected to the docking device 10, and has the same structure as the portable information device 12A in FIG. 2A other than their dimensions in the front-rear direction and in the width direction. Like reference numerals indicate parts of the portable information device 12B in FIG. 2B that are equivalent or similar to those of the portable information device 12A in FIG. 2A, and their detailed description is omitted.

As shown in FIG. 2B, the portable information device 12B has dimension L2 in the front-rear direction shorter than dimension L1 in the front-rear direction of the portable information device 12A. The portable information device 12A and the portable information device 12B have the same or substantially the same pitch between their rear end face 14c and the connection terminals 24a to 24c or the guide holes 26a, 26b. The portable information device 12A and the portable information device 12B have the same or substantially the same pitch between their bottom face 14b and the connection terminals 24a to 24c or the guide holes 26a, 26b as well. Another portable information device having different specifications to be attached to the docking device 10 may have a similar positional relationship of their connection terminals 24a to 24c and the guide holes 26a, 26b.

Figure 3A:
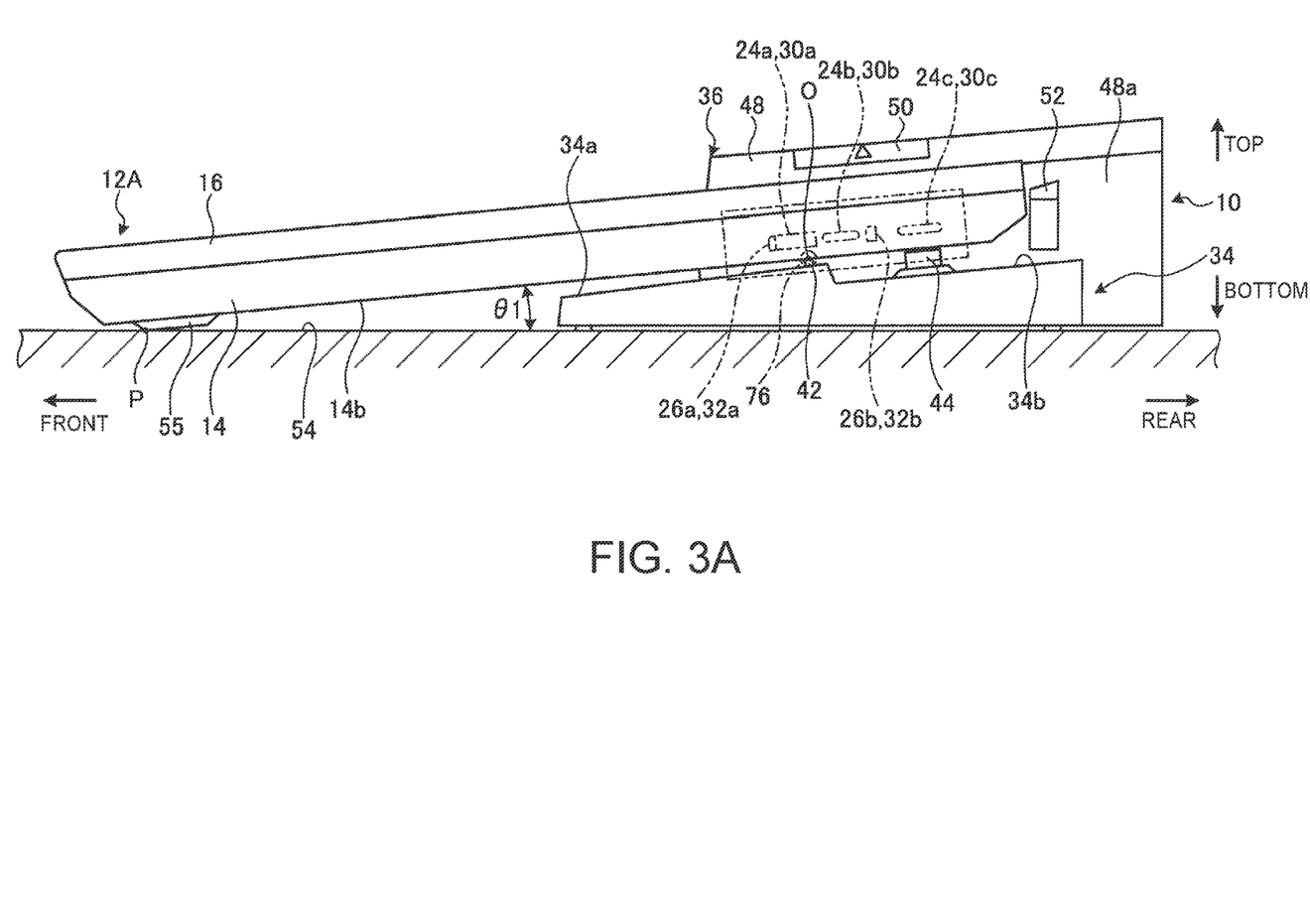
FIG. 3A is a side view of the portable information device from FIG. 2A attaching to a docking device.
Figure 3B:
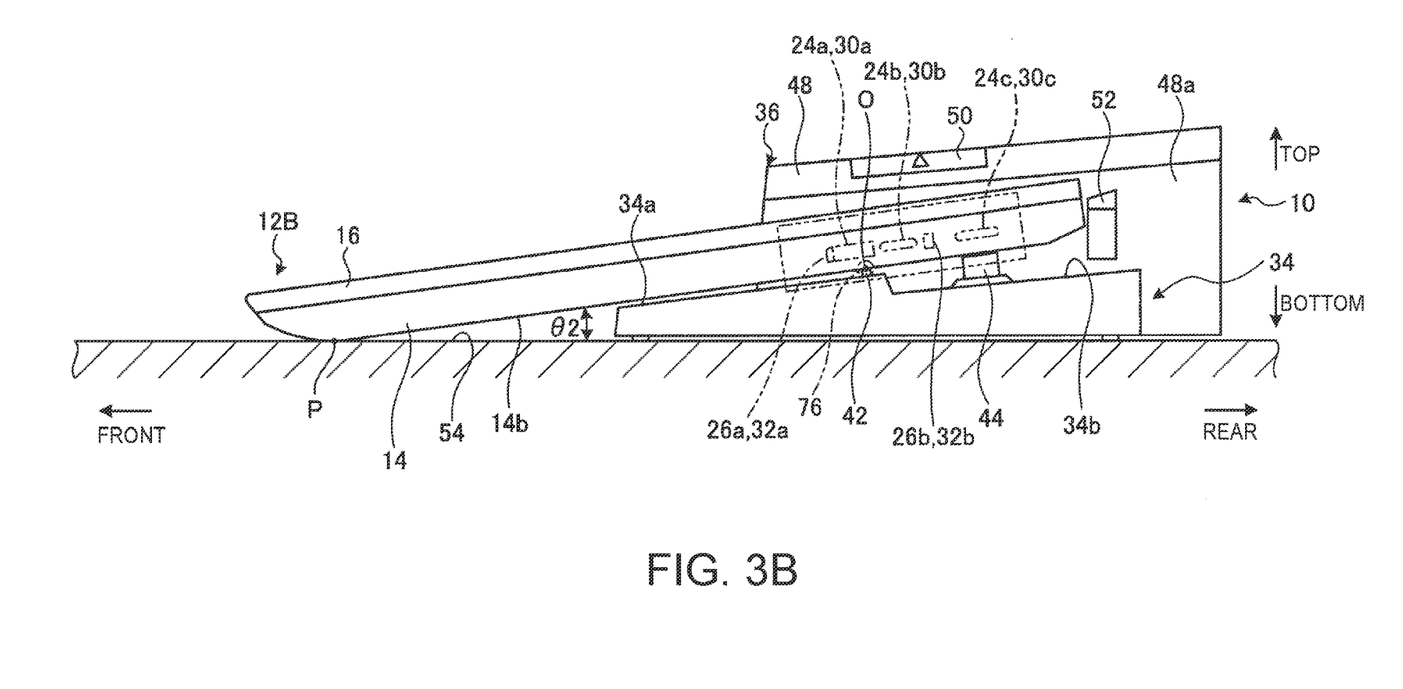
FIG. 3B is a side view of the portable information device from FIG. 2B attaching to a docking device.

FIG. 3A is a side view of the portable information device 12A from FIG. 2A attaching to the docking device 10. FIG. 3B is a side view of the portable information device 12B from FIG. 2B attaching to the docking device 10.

As shown in FIGS. 1, 3A and 3B, the docking device 10 is to mount the main body chassis 14 of the portable information device 12A or of the portable information device 12B thereon for use. The docking device 10 includes a device mounting part 34 and a connection part 36.

The device mounting part 34 has an upper face of a size enabling the mounting of a substantially rear half of the portable information device 12A, 12B, for example. The device mounting part has a thin box shape and is made of resin, for example. The device mounting part 34 includes a mount 34a, and the bottom face 14b of the portable information device 12A, 12B is mounted on the mount 34a. The mount 34a has an inclined face having a height gradually increasing from the front to the rear. The device mounting part has a clearance 34b disposed rearward of the mount 34a, and the clearance has a height lower than the mount 34a. The clearance 34b is a depression so as not to collide with a battery (not illustrated) or the like, if any, that protrudes from the lower face of the portable information device 12A, 12B at a rear part.

Figure 4:
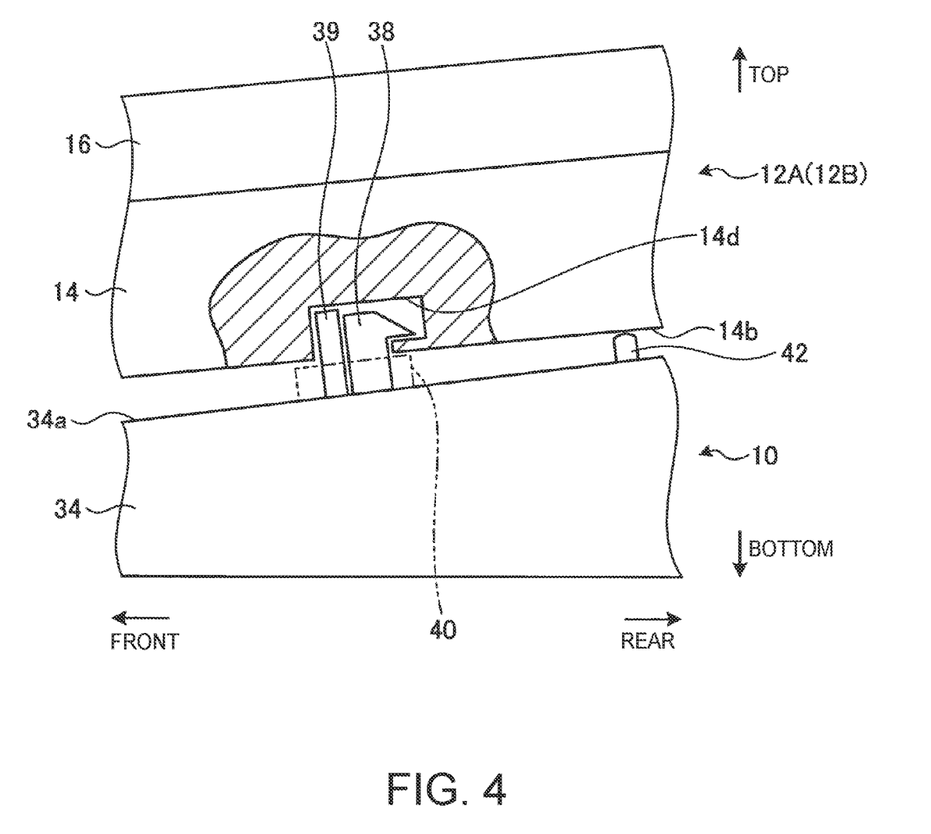
FIG. 4 is an enlarged view of the engagement structure of a hook and a hole.

The mount 34a has a protrusion 38 for engagement, a guidepost 39 and a detection pin 40 on the upper face and close to the left end. The protrusion 38 has a hook at the upper end. The hook is directed rearward, and is elastically biased toward the rear. As shown in FIG. 4, the protrusion 38 can engage with a hole for engagement 14d at the bottom face 14b of the portable information device 12A, 12B. Such engagement of the protrusion 38 with the hole 14d can retain the portable information device 12A, 12B in the up-down direction relative to the device mounting part 34. The guidepost 39 is inserted into the hole 14d together with the protrusion 38, and the guidepost enables the positioning of the portable information device 12A, 12B in the front-rear direction and in the left-right direction. The detection pin 40 can be pressed by the bottom face 14b of the portable information device 12A, 12B.

The mount 34a has legs 42 on the upper face and close to the left and right edges, and these legs support the bottom face 14b of the portable information device 12A, 12B. These left and right legs 42, 42 are arranged side by side in the left-right direction, and have the same or substantially the same position in the front-rear direction on the upper face of the mount 34a. The legs 42 are prismatic protrusions extending in the left-right direction, for example, and are made of resin or hard rubber, for example.

The clearance 34b has a vertically-moving member 44 on the upper face and close to the left end, and has a rear supporting leg 45 on the upper face and close to the right end. The vertically-moving member 44 can move up and down due to a pressing force from a rear-end part of the bottom face 14b of the portable information device 12A, 12B mounted on the mount 34a. The vertically-moving member 44 is a detector to detect the mounting angle θ of the portable information device 12A, 12B mounted on the device mounting part 34. The rear supporting leg 45 supports a rear-end part of the bottom face 14b of the portable information device 12A, 12B mounted on the mount 34a. The rear supporting leg 45 can move up and down, for example, and supports the portable information device 12A, 12B at a predetermined ascending position by an elastic member or a stopper mechanism, which are not illustrated, for example.

The connection part 36 has a housing 48 that is a cuboid box made of resin, for example. The housing 48 has a height larger than that of the device mounting part 34. The housing 48 stands by the device mounting part 34, and has a wall 48a to be opposed to the lateral face 14a of the portable information device 12A, 12B when the portable information device is mounted on the device mounting part 34. The wall 48a has an opening 48b, and the connectors 30a to 30c and the guide pins 32a, 32b (they may be collectively called a connector 30) can move toward or away from the lateral face 14a of the portable information device 12A, 12B in the left-right direction through the opening 48b.

The housing 48 has a lever 50 and a power-supply button 51 on the upper face. The lever 50 is manipulated by a user to move the connector 30 toward or away from a device to be mounted through the opening 48b. The power-supply button 51 turns the power supply of the docking device 10 ON and OFF.

The connection part 36 has a positioning member 52 placed rearward of the opening 48b. The positioning member 52 protrudes from the wall 48a to the right. The so positioning member 52 comes in contact with the rear end face 14c of the portable information device 12A, 12B when the portable information device is mounted on the device mounting part 34 for positioning of the portable information device 12A, 12B in the front-rear direction. The positioning member 52 can move up and down so as not to interfere with the opening/closing operation of the display chassis 16, and is normally biased elastically upward.

As shown in FIGS. 3A-3B, the docking device 10 is mounted on a flat face 54, such as the upper face of a desk, for use. When the portable information device 12A, 12B is mounted on the docking device 10, the front end of the portable information device comes in contact with the flat face 54 for supporting and the rear end of the portable information device comes in contact with the legs 42 on the mount 34a for supporting. In this way, the portable information device on the docking device has a forward-descending angular position. In the present embodiment, the bottom face 14b of the portable information device 12A, 12B comes in contact with the light and right legs 42 of the docking device 10, and this position of the portable information device is a reference point O of the mounting position on the docking device 10. Relative to this reference point O, the portable information device 12A, 12B is inclined while descending to the front end so that the bottom face 14b stably comes in contact with the flat face 54 at a contact point P. The portable information device 12A in FIG. 3A has a rubber leg 55 on the bottom face 14b at a front part, and the contact point P is the position of this rubber leg 55.

The portable information device 12A and the portable information device 12B differ in dimension in the front-rear direction. The portable information device 12A therefore has a large distance from the reference point O to the contact point P (see FIG. 3A). The portable information device 12B has a smaller distance from the reference point O to the contact point P than that of the portable information device 12A (see FIG. 3B). The rear-end face 14c of the portable information device 12A, 12B is positioned in the front-rear direction by the positioning member 52. With this configuration, the portable information device 12A, 12B moves the front end vertically while oscillating about the reference point O that is close to the rear end before the contact point P comes in contact with the flat face 54.

Referring to FIG. 3A, the mounting angle θ1 shows the angle of the bottom face 14b of the portable information device 12A relative to the flat face 54 when the portable information device 12A is mounted on the docking device 10 having a forward-descending posture. Referring to FIG. 3B, the angle θ2 shows the angle of the bottom face 14b of the portable information device 12B relative to the flat face 54 when the portable information device 12B is mounted on the docking device 10 having a forward-descending posture. The angle θ1 of the mounted portable information device 12A is smaller than the angle θ2 of the mounted portable information device 12B. Conversely, the angle θ2 of the mounted portable information device 12B is larger than the angle θ1 of the mounted portable information device 12A. Naturally a portable information device having a larger dimension in the front-rear direction than that of the portable information device 12A has a small mounting angle, and a portable information device having a smaller dimension in the front-rear-direction than that of the portable information device 12B has a larger mounting angle.

Therefore, as shown in FIGS. 3A and 3B, the connection terminals 24a to 24c and the guide holes 26a, 26b (hereinafter collectively called a connection terminal 24) of the portable information devices 12A, 12B also have the angles corresponding to their mounting angles θ1 and θ2. The docking device 10 of the present embodiment includes an angle adjustment part 56 configured to rotate the connector 30 in accordance with a difference in the mounting angle θ1, θ2 due to a difference in the dimension in the front-rear direction between the portable information devices 12A and 12B and adjust the angle so that the connector 30 can connect to the connection terminal 24. This allows the docking device 10 to change the angle of the connector 30 in accordance with a difference in the angle of the connector 24 due to different mounting angles θ1 and θ2 of the portable information devices 12A and 12B, whereby the connector 30 can connect to the connection so terminal 24 smoothly.

Next the following describes the structure of the angle adjustment part 56 and the structure of a moving device 58. The moving device 58 moves the connector 30 having the angle adjusted by the angle adjustment part 56 toward or away from the portable information device 12A, 12B.

Figure 5:
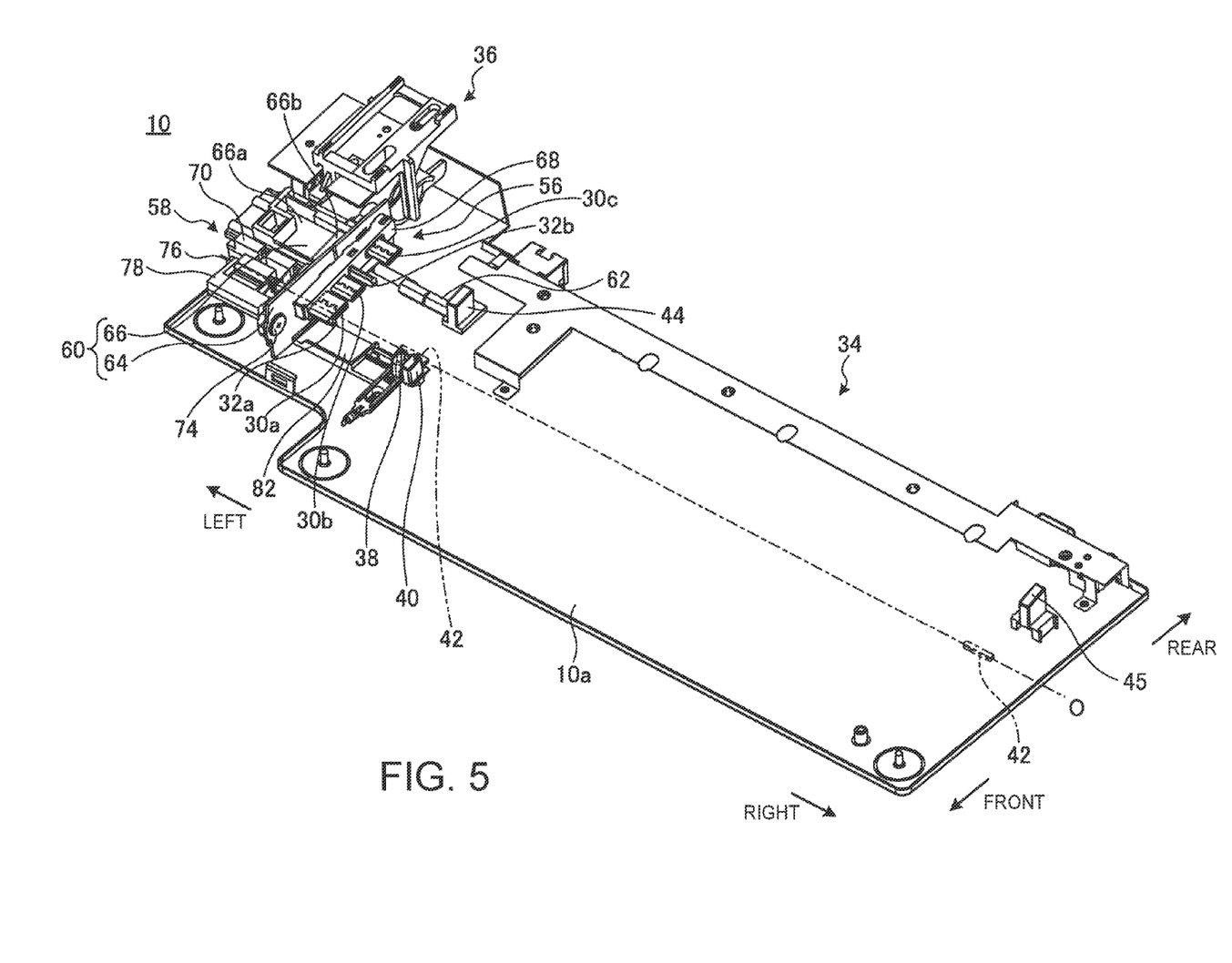
FIG. 5 is a perspective view of an example of the internal structure of a docking device.
Figure 6:
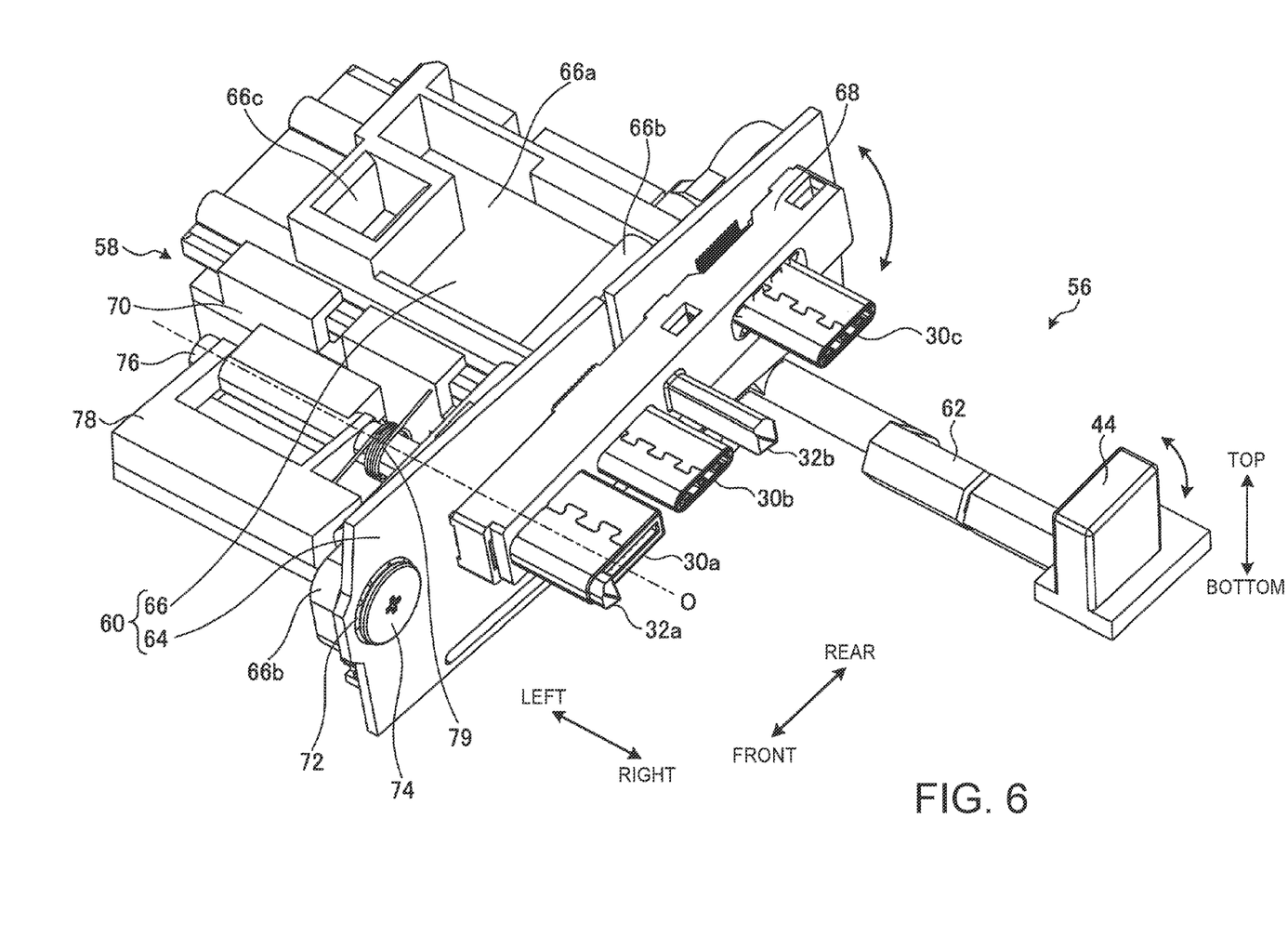
FIG. 6 is a perspective view of an example of the structure of an angle adjustment part.

FIG. 5 is a perspective view of an example of the internal structure of the docking device 10. FIG. 6 is a perspective view of an example of the structure of the angle adjustment part 56.

As shown in FIGS. 5-6, the angle adjustment part 56 is disposed from the connection part 36 to the device mounting part 34. The angle adjustment part 56 includes a supporting member 60, an interlocking member 62, and the vertically-moving member 44. The angle adjustment part 56 operates on the upper face of a base plate (base) 10a that is the bottom face of the docking device 10.

The supporting member 60 includes a board 64 and a slide member 66. The board 64 is an electronic board that electrically connects to the connectors 30a to 30c, and is a plate-like member extending in the front-rear direction. The connector 30 is mounted on the right surface of the board 64 via a holder 68. The holder has a rectangular rod shape. The slide member 66 includes a slider 66a and a board supporting part 66b. The slider 66a is supported at the upper face of a slide base 70 to be movable toward and away from a device to be mounted in the left-right direction. The board supporting part 66b is a rod-like member extending in the front-rear direction, and joins with and is fixed to the rear face of the board 64 on the left. The slider 66a and the board supporting part 66b join integrally.

The board supporting part 66b supports the board 64 via a floating device 72. The board 64 is fastened and fixed to the board supporting part 66b with a screw 74. The screw 74 threadedly connects to an internal screw formed in the board supporting part 66b through a through hole of the board 64. In the present embodiment, an elastic member, such as rubber, intervenes between the outer peripheral face of the screw 74 and the inner peripheral face of the through hole of the board 64 to make up the floating device 72, and the board supporting part 66b supports the board 64 in a floating manner with this floating device. The floating device 72 may be made up of another elastic member, such as a spring, to support the board 64 elastically at the board supporting part 66b.

The slide base 70 joins with a bearing 78 to be rotatable via a rotary shaft 76. The rotary shaft 76 is a shaft extending in the left-right direction. The bearing 78 is fixed to the upper face of the base plate 10a. With this configuration, the supporting member 60 is supported rotatably in the up-down direction relative to the base plate 10a about the rotary shaft 76. Therefore as the supporting member 60 rotates via the rotary shaft 76, the connector 30 revolves about the rotary shaft 76. At this time, the supporting member 60 is always biased so that its rear end moves upward by a torsion coil spring 79 disposed around the rotary shaft 76. That is, the connector 30 is always biased so that a part close to the connector 30c revolves above from a part close to the connector 30a.

The docking device 10 of the present embodiment is configured so that the top faces of the legs 42 are located on the line extended from the center axis O of the rotary shaft 76 (see FIGS. 3A, 3B and 5). That is, the line extended from the center axis O of the rotary shaft 76 coincides with or substantially coincides with the reference point O that is the supporting position where the legs 42 support the bottom face 14b of the portable information device 12A, 12B.

The interlocking member 62 is a rod-like member to join the slide base 70 and the vertically-moving member 44. The interlocking member 62 of the present embodiment extends from a lower part of the slide base 70 to the right, bends like a crank forward and upward, and then extends to the right again to be fixed to a lower part of the vertically-moving member 44. The interlocking member 62 has a rod-like shape and is rigid, and transmits the vertical motion of the vertically-moving member 44 to the slide base 70 so as to rotate the slide base 70 around the rotary shaft 76. That is, the vertically-moving member 44 moves up and down while vertically revolving about the rotary shaft 76 via the slide base 70. Therefore as the vertically-moving member 44 moves up and down in the revolving direction, the supporting member 60 and the connector 30 also move up and down in the revolving direction via the slide base 70. The crank shape at an intermediate part of the interlocking member 62 is a clearance to avoid the interference between the interlocking member 62 and the board 64 when the slide member 66 moves toward or away from in the left-right direction relative to the slide base 70.

As shown in FIG. 1, the vertically-moving member 44 protrudes through an opening formed at the clearance 34b, and moves up and down in the vertical revolving direction around the rotary shaft 76 while being guided by a guide wall 80 surrounding the opening. The vertically-moving member 44 serves as a detector of the angle adjustment part 56 to detect the mounting angles θ1, θ2 of the portable information device 12A, 12B mounted on the device mounting part 34. Specifically the vertically-moving member 44 is always at an ascending position due to the biasing force of the torsion coil spring 79. When the portable information device 12A, 12B is mounted on the device mounting part 34, the rear-end part of the bottom face 14b of the portable information device presses the vertically-moving member 44 downward. As a result, the vertically-moving member 44 moves downward while revolving down around the rotary shaft 76 to a descending position corresponding to the mounting angle θ1, θ2 of the mounted portable information device 12A, 12B, and is held at this descending position (see FIGS. 3A and 3B).

Figure 7A:
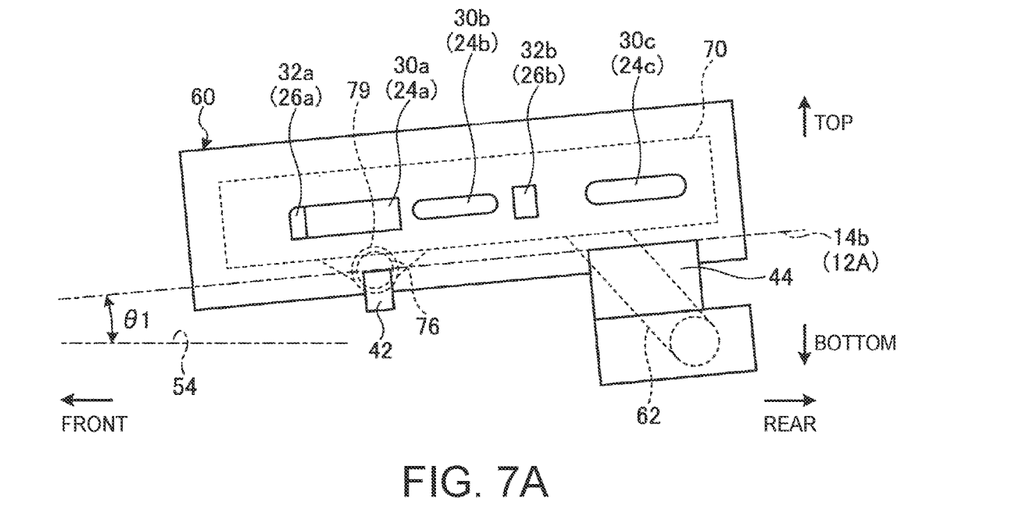
FIG. 7A is a side view showing the operation of the angle adjustment part when the portable information device from FIG. 2A is mounted on a docking device.
Figure 7B:
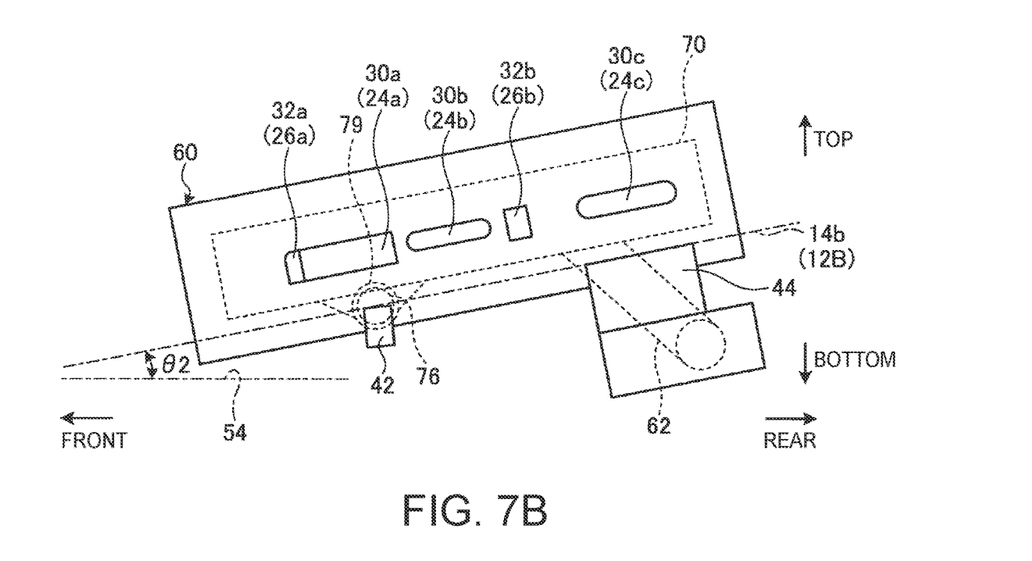
FIG. 7B is a side view showing the operation of the angle adjustment part when the portable information device from FIG. 2B is mounted on a docking device.

FIG. 7A is a side view showing the operation of the angle adjustment part 56 when the portable information device 12A in FIG. 2A is mounted on the docking device 10. FIG. 7B is a side view showing the operation of the angle adjustment part 56 when the portable information device 12B in FIG. 2B is mounted on the docking device 10.

As shown in FIG. 7A, the portable information device 12A is mounted on the docking device 10 while descending forward with the mounting angle θ1. At this time, the bottom face 14b of the portable information device 12A presses the vertically-moving member 44 of the angle adjustment part 56 downward. Then, the vertically-moving member 44 rotates downward around the rotary shaft 76 together with the interlocking member 62 and the supporting member 60 joined via the slide base 70. As a result, the connector 30 has the same mounting angle θ1 as that of the connection terminal 24 of the portable information device 12A.

As shown in FIG. 7B, the above description about the portable information device 12A goes for the portable information device 12B as well. That is, the portable information device 12B is mounted on the docking device 10 while descending forward with the mounting angle θ2. At this time, the connector 30 has the same angle as that of the connection terminal 24 of the portable information device 12B. In this way, the vertically-moving member 44 of the angle adjustment part 56 serves as the detector to detect the mounting angle θ1, θ2 of the portable information device 12A, 12B, and the angle of the connector 30 is adjusted based on the detection result.

Figure 8A:
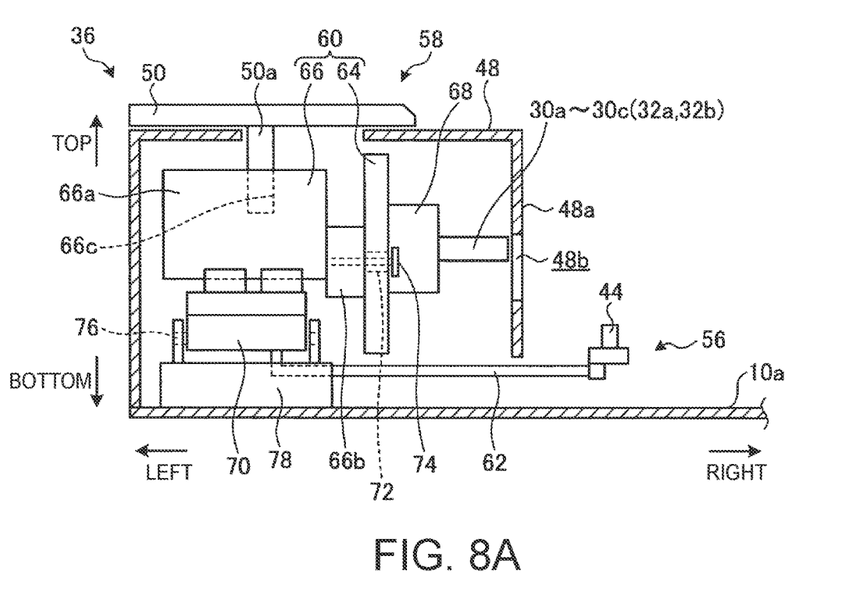
FIG. 8A is a side view showing a connector retracted into the opening.
Figure 8B:
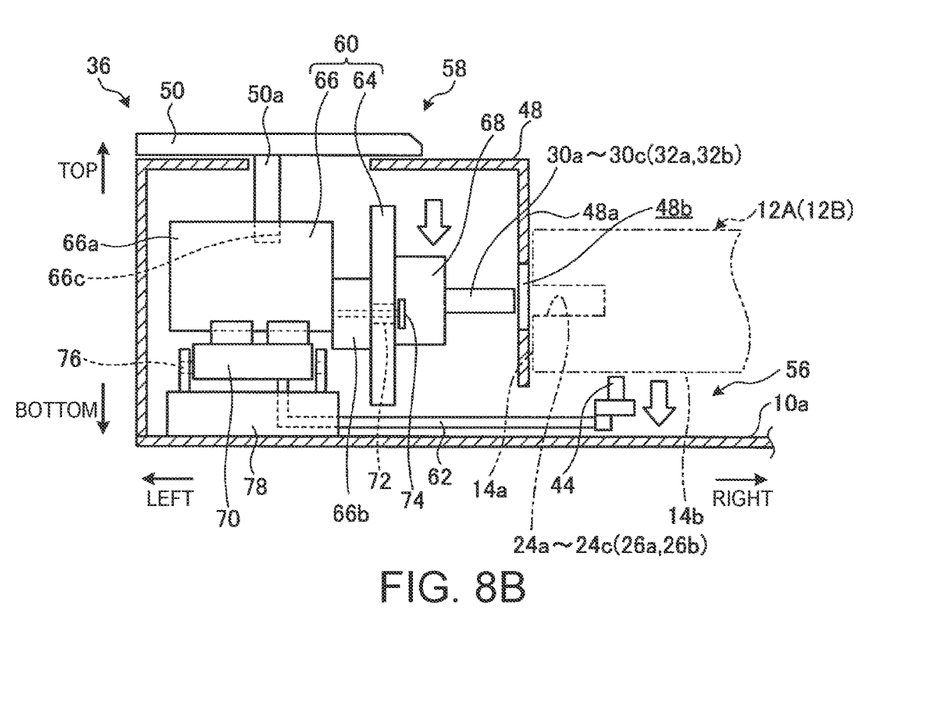
FIG. 8B is a side view showing a portable information device mounted on the device mounting part from the state of FIG. 8A.
Figure 8C:
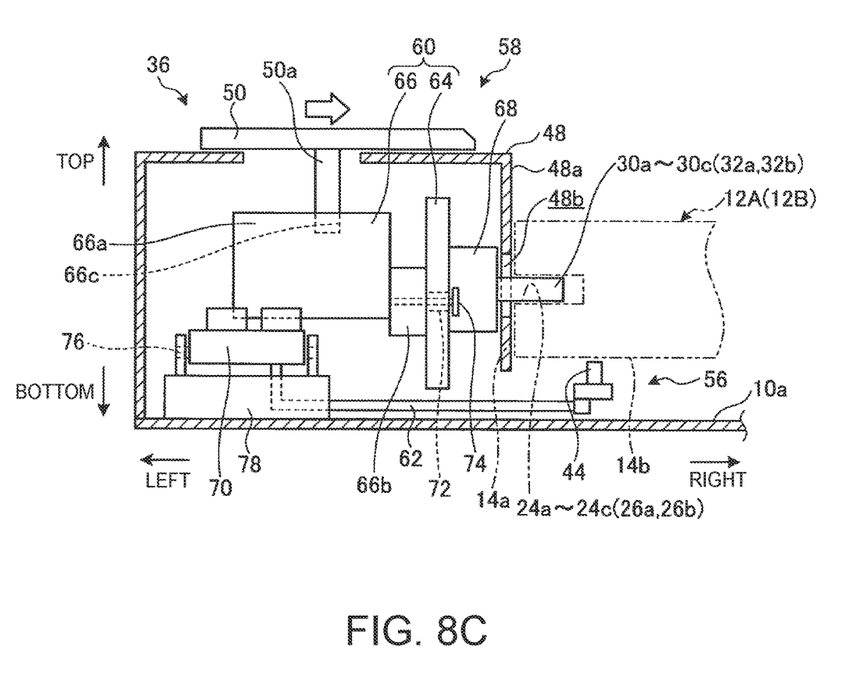
FIG. 8C is a side view showing the connector moved outside of the opening by a moving device from the state of FIG. 8B.

FIG. 8A is a side view (partially in section) showing the connector 30 retracted into the opening 48b. FIG. 8B is a side view (partially in section) schematically showing the portable information device 12A (12B) mounted on the device mounting part 34 from the state of FIG. 8A. FIG. 8C is a side view (partially in section) showing the connector 30 moved outside of the opening 48b by the moving device 58 from the state of FIG. 8B.

The moving device 58 moves the connector 30 toward and away from a device to be mounted through the opening 48b at the wall 48a of the housing 48. In response to the movement of the lever 50 to the right or the left, the moving device 58 moves the connector 30 toward or away from the device to be mounted through the opening 48b. The moving device 58 includes the lever 50, the supporting member 60, and the slide base 70.

The lever 50 can slide to the left and the right on the upper face of the housing 48. The lever 50 has a joint 50a on the lower face, and the joint protrudes downward from the lower face. The joint 50a is inserted into a joint hole 66c bored at the upper face of the slider 66a of the slide member 66. Whereas the joint 50a is inserted into the joint hole 66c so as not to move in the left-right direction relative to the joint hole, the joint 50a is inserted into the joint hole 66c so as to be movable relative to the vertically revolving motion of the slider 66a around the rotary shaft 76. That is, the joint 50a is inserted into the joint hole 66c so as to join with the joint hole 66c integrally in the left-right direction and to be slidable in the substantially up-down direction (revolving direction).

Therefore, in response to the sliding of the lever 50 to the left and the right, the supporting member 60 of the moving device 58 slides to the left and right. As a result, the connector 30 moves toward and away from a device to be mounted in the left-right direction. At this time, the slide base 70 is supported rotatably relative to the bearing 78 fixed on the base plate 10a via the rotary shaft 76. Therefore the moving device 58 can move the connector 30 to the left and the right while keeping the angular position of the connector 30 that is adjusted by the angle adjustment part 56.

The following describes the operation for mounting the portable information device 12A, 12B to the docking device 10.

Before mounting the portable information device 12A, 12B (initial state), the docking device 10 is at the initial position where the lever 50 retracts to the left (see FIG. 8A). In this state, the supporting member 60 also retracts to the left at the initial position, and so the connector 30 is stored in the housing 48. In this state, the vertically-moving member 44 is at the uppermost initial position due to the biasing force of the torsion coil spring 79 and so the connector 30 has an angular position that is most inclined by descending forward. The connector 30 therefore has an angle larger than the mounting angle θ2 shown in FIG. 7B.

The portable information device 12A, 12B is mounted on the docking device 10 in such an initial state. Firstly, when the portable information device 12A in FIG. 2A is mounted, the user mounts the portable information device 12A on the mount 34a. Specifically as shown in FIG. 3A, the rear end face 14c of the portable information device 12A is positioned with the positioning member 52, and the lateral face 14a is positioned with the wall 48a of the housing 48, and the portable information device in this state is mounted on the mount 34A. Then, the portable information device 12A is mounted with the mounting angle θ1 relative to the flat face 54 while coming the front end in contact with the flat face 54 at the contact point P and coming a part close to the rear end in contact with the legs 42 at the reference point O. Similarly the bottom face 14b of the portable information device 12A presses the detection pin 40 downward, and the hole 14d of the portable information device engages with the protrusion 38 (see FIG. 4).

At this time, since the bottom face 14b of the portable information device 12A having the mounting angle θ1 presses the vertically-moving member 44 of the angle adjustment part 56 downward, the supporting member 60 rotates via the rotary shaft 76. As a result, as shown in FIGS. 7A and 8B, the connector 30 revolves downward around the rotary shaft 76 to have an angular position corresponding to the mounting angle θ1, and is kept at this angular position. As a result, the connection terminal 24 with the mounting angle θ1 and the connector 30 have the same angular position, so that the connector 30 and the connection terminal 24 are mutually opposed.

Then as shown in FIG. 8C, the user slides the lever 50 to the right. This firstly inserts the guide pins 32a and 32b into the guide holes 26a and 26b, respectively, and next connects the connectors 30a to 30c to the connection terminals 24a to 24c. That is, the angle adjustment part 56 adjusts the rotary position of the connector 30 to correspond to the mounting angle θ1 of the portable information device 12A, whereby the connector 30 can connect to the connection terminal 24 smoothly and correctly. Since the interlocking member 62 joins with the slide base 70, the interlocking member 62 and the vertically-moving member 44 do not relate to the movement of the connector 30 to the left and the right, and so the moving device 58 can have a simple structure.

Additionally the angle adjustment part 56 includes the floating device 72 between the board 64 supporting the connector 30 and the slide member 66 (board supporting part 66b) supporting the board 64. Therefore such a floating device 72 automatically adjusts a slight displacement, if any, in angular position after the angle adjustment between the connector 30 and the connection terminal 24 for connection of the connector and the connection terminal.

The present embodiment is configured so that when the bottom face 14b of the portable information device 12A presses the detection pin 40 downward, a lock slider 82 shown in FIG. 5 becomes slidable to the left and the right. The lock slider 82 joins with the slider 66a to be slidable together with the slider to the left and the right. That is, the present embodiment is configured so that, when the lock slider 82 becomes slidable, the user can slide the lever 50. In this way, the docking device 10 is configured so that the user cannot move the connector 30 with the lever 50 to the left and the right before mounting the portable information device 12A, for example, on the mount 34a. This can avoid the user from mounting the portable information device 12A, for example, on the mount 34a while erroneously ejecting the connector 30 to the outside.

Next, when the portable information device 12B in FIG. 2B is mounted, the portable information device 12B is mounted on the mount 34a similarly to the case of the portable information device 12A as stated above. Then, the portable information device 12B is mounted with the mounting angle θ2 relative to the flat face 54 while coming the front end in contact with the flat face 54 at the contact point P and coming a part close to the rear end in contact with the legs 42 at the reference point O.

At this time, the bottom face 14b of the portable information device 12B having the mounting angle θ2 presses the vertically-moving member 44 downward of the angle adjustment part 56. As a result, as shown in FIGS. 7B and 8B, the connector 30 revolves downward to have an angular position corresponding to the mounting angle θ2, and is kept at this angular position. As a result, the connection terminal 24 with the mounting angle θ2 and the connector 30 have the same angular position, so that the connector 30 and the connection terminal 24 are mutually opposed. Then as shown in FIG. 8C, the user slides the lever 50 to the right. Since the angle adjustment part 56 adjusts the rotary position of the connector 30 to correspond to the mounting angle θ2 of the portable information device 12B, the connector 30 can connect to the connection terminal 24 smoothly and correctly.

When removing the portable information device 12A, for example, from the docking device 10, the user moves the lever 50 to the left so as to retract the connector 30 and then removes the connector from the connection terminals 24. At this time, the lock slider 82 also slides to the left so as to cancel the engagement of the protrusion 38 with the hole 14d. As a result, the user can remove the portable information device 12A, for example, from the device mounting part 34 smoothly.

As stated above, the docking device 10 of the present embodiment is mounted on the flat face 54 for use, and to the docking device 10, the portable information device 12A, 12B can be attached detachably. The docking device 10 includes: the device mounting part 34 to mount the portable information device 12A, 12B having the forward-descending angular position so that the portable information device comes in contact with the flat face 54 at the front end and is supported by the device mounting part at the rear end; and the connection part 36 that stands by the device mounting part 34, and is opposed to the lateral face 14a of the portable information device 12A, 12B when the portable information device is mounted on the device mounting part 34. The docking device 10 further includes: the connector 30 disposed at the connection part 36 to be rotatable, the connector being connectable to the connection terminal 24 at the lateral face 14a of the portable information device 12A, 12B mounted on the device mounting part 34; the vertically-moving member 44 serving as a detector to detect the mounting angle θ1, θ2 of the portable information device 12A, 12B mounted on the device mounting part 34; and the angle adjustment part 56 configured to rotate the connector 30 in accordance with a result of the detection of the angle θ1, θ2 by the vertically-moving member 44 to adjust the angle of the connector to be connectable to the connection terminal 24.

With this configuration, the connector 30 of the docking device 10 can be adjusted to have the angular positions corresponding to different angles θ1, θ2 when the portable information devices 12A and 12B having different specifications are docked with the docking device. The connector 30 therefore can be opposed to the connection terminal 24 at the lateral face 14a of the portable information device 12A, 12B, and so the connector and the connection terminal can connect smoothly and correctly. The docking device 10 therefore can be docked with a plurality of types of portable information devices 12A and 12B, and is very versatile.

As stated above, the connector 30 may have a single structure, for example, instead of a triple structure. It should be noted here that the connection terminal 24 and the connector 30 including a plurality of terminals and a plurality of connectors, respectively, arranged side-by-side are greatly affected from a difference in angle between the connection terminal 24 and the connector 30 due to a difference in the mounting angles θ1 and θ2 of the portable information devices 12A and 12B. This means that the advantageous effect from the angle adjustment part 56 will increase more in the structure having a plurality of connection terminals 24 and a plurality of connectors 30 arranged side-by-side as in the present embodiment.

As stated above, the present embodiment illustrates the structure of docking with two types of portable information devices 12A and 12B having different dimensions in the front-rear direction. Other types of portable information devices may be docked as long as they are in the angular adjustment range of the connector 30 by the angle adjustment part 56. The angle adjustment part 56 of the present embodiment is configured to adjust the angle of the connector 30 within the range of the mounting range of about 4-degree to 9-degree, for example, and this angle for adjustment can be changed as needed.

In such a docking device 10, the device mounting part 34 has the legs 42 that come in contact with the bottom face 14b of the portable information device 12A, 12B to be mounted, and the legs 42 are disposed on the line extended from the center axis O of the rotary shaft 76. Specifically when the portable information device 12A, 12B is mounted on the device mounting part 34 as shown in FIG. 3A, 3B, their mounting angle of the portable information devices changes while having the legs 42 to support the bottom face 14b as the rotary center (reference point O). Since the docking device 10 has legs 42 on the line extended from the center axis O of the rotary shaft 76, the center point (reference point O) about the angular change of the portable information devices 12A and 12B and the center point (center axis O) about the angular change of the connector 30 coincide in the front-rear direction. This can make the mounting angles θ1 and θ2 of the portable information devices 12A and 12B equal to the angular positions of the connector 30 more correctly.

The docking device 10 includes the moving device 58, and the moving device moves the connector 30 having the angle adjusted by the angle adjustment part 56 toward or away from the connection terminal 24. The docking device 10 therefore can connect to the connection terminal 24 by mounting the portable information device 12A, 12B on the device mounting part 34 from vertically above, for example, and then moving the connector 30 toward the connection terminal. That is, the user does not have to perform an operation to connect the connection terminal 24 to the connector 30 while adjusting the position of the portable information device 12A, 12B during mounting of the portable information device 12A, 12B on the device mounting part 34, and so the user can easily dock the portable information device 12A, 12B with the docking device. Note here that a docking device is configured so that the portable information device 12A, 12B is mounted on the device mounting part 34 from vertically above, it may be difficult for the user to see the connecting position of the connector 30 to the connection terminal 24 from the outside. Since the docking device 10 is configured to move the connector 30 after the angle adjustment part 56 adjusts the angular position of the connector 30, the connector 30 and the connection terminal 24 can connect smoothly. The moving device 58 may be omitted. In this case, the connector 30 may protrude from the wall 48a. After the user mounts the portable information device 12A, 12B on the device mounting part 34 so as to adjust the angle of the connector 30, then the user may slide the portable information device 12A, 12B laterally to connect the connection terminal 24 to the connector 30.

The above illustrates the vertically-moving member 44 as the detector to detect the mounting angle θ1, θ2 of the portable information device 12A, 12B, and the vertically-moving member rotates integrally with the connector 30. This detector may be a separate member from the connector 30, for example, which may be a detection pin, for example, that can move up and down due to pressing force of the bottom face 14b of the portable information device 12A, 12B. In this structure, the mounting angle θ1, θ2 may be calculated from the amount of moving-down of the detection pin, for example, and the connector 30 and the supporting member 60 may rotate to a position corresponding to the calculation using art electric motor, for example.

As has been described, the present invention provides an improved docking device for an electronic apparatus.

While the invention has been particularly shown and described with reference to a preferred embodiment, it will be understood by those skilled in the art that various changes in form and detail may be made therein without departing from the spirit and scope of the invention.

What is claimed is:

1. A docking device comprising:
a device mounting part mounts a portable information device having a forward-descending angular position so that said portable information device comes in contact with a n external face for use at a front end and is supported by said device mounting part at a rear end;
a connection part, which stands by said device mounting part, is opposed to a lateral face of said portable information device when said portable information device is mounted on the device mounting part;
a connector disposed at said connection part to be rotatable, wherein said connector being connectable to a connection terminal at said lateral face of said portable information device mounted on said device mounting part;
a detector detects a mounting angle of said portable information device mounted on said device mounting part; and
an angle adjustment part rotates said connector according to said mounting angle detected by said detector to adjust said angle of said connector to be connectable to said connection terminal.

2. The docking device of claim 1, wherein said angle adjustment part joins rotatably relative to a base to support said device mounting part and said connection part via a rotary shaft.

3. The docking device of claim 2, wherein said connector moves towards and away from said connection terminal.

4. The docking device of claim 3, wherein said angle adjustment part includes at least a slide base to support said supporting member to be slidable along a direction in which said connector moves towards and away from said connection terminal.

5. The docking device of claim 4, wherein said slide base joins with said base so as to be rotatable via said rotary shaft.

6. The docking device of claim 2, wherein said connector is supported at said supporting member via a floating device member.

7. The docking device of claim 1, further comprising a moving device to move said connector having said angle adjusted by said angle adjustment part towards and away from said connection terminal.

8. The docking device of claim 1, wherein a plurality of the connection terminals is arranged side-by-side at the lateral face of said portable information device in a front-rear direction.

9. The docking device of claim 8, wherein a plurality of the connectors is arranged side-by-side so as to correspond to said connection terminals.

10. The docking device of claim 2, wherein said angle adjustment part includes at least a supporting member to support said connector.

11. The docking device of claim 10, wherein
said connector moves towards and away from said connection terminal,
said angle adjustment part includes at least a slide base to support said supporting member to be slidable along a direction in which said connector moves towards and away from said connection terminal,
said slide base joins with said base so as to be rotatable via said rotary shaft, and
said interlocking member is fixed to said slide base.

12. The docking device of claim 2, wherein said detector includes at least a vertically-moving member that moves up and down due to pressing with a bottom face of said portable information device mounted on said device mounting part.

13. The docking device of claim 12, wherein said angle adjustment part includes at least an interlocking member to interlock moving up-down of said vertically-moving member with rotating of said supporting member.

14. The clocking device of claim 2, wherein said device mounting part includes at least a leg that comes in contact with a bottom face of said portable information device to be mounted.

15. The docking device of claim 14, wherein said leg is disposed on a line extended from a center axis of said rotary shaft.

16. The docking device of claim 15, further comprising a positioning member to position a rear face of said portable information device to be mounted, on said device mounting part.

* * * * *